UNITED STATES PATENT OFFICE.

THOMAS W. NICHOLS, OF SOUTH BEND, INDIANA.

PROCESS OF MAKING SOAP.

SPECIFICATION forming part of Letters Patent No. 630,092, dated August 1, 1899.

Application filed March 30, 1898. Serial No. 675,766. (No specimens.)

*To all whom it may concern:*

Be it known that I, THOMAS W. NICHOLS, a citizen of the United States, residing at South Bend, in the county of St. Joseph and State of Indiana, have invented new and useful Improvements in Methods of Making Soft Soap, of which the following is a specification.

My invention relates to an improved method or process for manufacturing soft soap; and it consists in first boiling together water, sal-soda, and lime, then allowing the same to cool and settle, then drawing off the clear liquid and raising to the boiling-point, and adding thereto beeswax dissolved in chloroform, alcohol, tincture of cantharides, glycerin, chloroform, beef-gall, arrowroot, and bar-soap shaved fine in about the proportions hereinafter described.

In carrying my invention into effect I take two gallons of boiling water and dissolve therein four pounds of sal-soda and one pound of lime, the water slaking the lime, and stir for a few times, the result being the formation of caustic soda and carbonate of lime. The above solution is then allowed to cool and settle, the carbonate of lime being precipitated, and the clear liquid with the caustic soda in solution being drawn off. This liquid is then placed in a suitable receptacle and brought to the boiling-point, when there is added thereto ten ounces of beeswax dissolved in one pint of alcohol. Three ounces of the tincture of cantharides, fourteen ounces of glycerin, two ounces of chloroform, three ounces of beef-gall, and six ounces of arrowroot are then added, with six pounds of bar-soap shaved fine. The mixture is then allowed to boil a few minutes and when cooled will give a soft or jelly soap, which is an excellent detergent.

Having thus fully described my invention, what I claim is—

The method herein described of making soft soap which consists in first boiling together water, sal-soda and lime in about the proportions specified, then allowing the same to cool and settle, then drawing off the clear liquid and raising it to the boiling-point and adding thereto, beeswax dissolved in alcohol, tincture of cantharides, glycerin, chloroform, beef-gall, arrowroot and bar-soap shaved fine, in about the proportions specified.

In testimony whereof I have hereunto set my hand in presence of two subscribing witnesses.

THOMAS W. NICHOLS.

Witnesses:
   F. E. LAMBERT,
   GEO. HEPLER.